United States Patent [19]

Kurokawa et al.

[11] 4,003,973
[45] Jan. 18, 1977

[54] PROCESS AND APPARATUS FOR PRODUCING SHEET FILM FROM TUBULAR THERMOPLASTIC RESIN FILM

[75] Inventors: Kazuhiko Kurokawa; Teruchika Kanou, both of Fuji, Japan

[73] Assignee: Kabushiki Kaisha Kohjin, Tokyo, Japan

[22] Filed: June 23, 1972

[21] Appl. No.: 265,894

[52] U.S. Cl. .............................. 264/101; 264/146; 264/178 R; 264/235; 264/237; 264/348; 425/71; 425/326 R
[51] Int. Cl.² ..................... B29D 7/20; B29C 25/00
[58] Field of Search ............... 264/95, 89, 101, 90, 264/280, 290, 146, 237, 178 R, 348, 235, 209; 425/70, 71, 72, 326 R

[56] References Cited
UNITED STATES PATENTS

| | | | |
|---|---|---|---|
| 2,433,937 | 1/1948 | Tornberg | 264/95 |
| 2,955,318 | 10/1960 | Cook et al. | 264/280 |
| 3,008,185 | 11/1961 | Goldman | 264/95 |
| 3,090,991 | 5/1963 | Hathaway | 264/290 |
| 3,108,324 | 10/1963 | Zavasnik | 264/290 |
| 3,193,547 | 7/1965 | Schott, Jr. | 264/95 |
| 3,450,806 | 6/1969 | Matsuo et al. | 264/95 |
| 3,579,618 | 5/1971 | Stewart et al. | 264/101 |
| 3,655,846 | 4/1972 | Kanoh et al. | 264/95 |

*Primary Examiner*—Jeffery R. Thurlow
*Attorney, Agent, or Firm*—Fred Philpitt

[57] ABSTRACT

A sheet film is produced from a tubular thermoplastic resin film by cooling a molten tubular film of crystalline thermoplastic resin, for example, polypropylene, extruded downward from an annular die in direct contact simultaneously with cooling liquids on the outside and inside of the film, the cooling liquid on the outside being in an outside cooling liquid tank and in contact with the outside of the film and the cooling liquid on the inside flowing down along the surface of a mandrel provided through the outside cooling liquid tank and in contact with the inside of the film, a liquid level of the cooling liquid on the inside being kept higher by 5-15 mm than that of the cooling liquid on the outside; cutting open length wise one or two side ends of the film just before being flattened and folded by nip rolls thereby to discharge the cooling liquid from the inside; and removing the liquid attached to the surfaces of the resulting sheet films withdrawn by the nip rolls promptly. The sheet films having a good transparency, good flatness and less uneveness in thickness can be thereby produced at a high speed.

8 Claims, 4 Drawing Figures

PROCESS AND APPARATUS FOR PRODUCING SHEET FILM FROM TUBULAR THERMOPLASTIC RESIN FILM

DESCRIPTION OF THE INVENTION

This invention relates to a process and an apparatus for producing a sheet film from a tubular film of thermoplastic resin, and more particularly to a process and an apparatus for producing a sheet film having a good transparency, good flatness and less unevenness in thickness at a high speed from a crystalline thermoplastic resin through a molten tubular film, which comprises melt-extruding a thermoplastic resin from an annular die of an extruder, air-cooling the extruded annular molten resin by an air ring, preliminarily cooling and solidifying the molten resin by a cooling liquid through an outside cooling liquid tank and an inside liquid-cooled mandrel, and also by a descending cooling liquid stream along the surface of the mandrel thereby to form a tubular film, laying the film flat and at the same time cutting open lengthwise two ends or one end of the laid-flat film thereby to obtain two sheets of films or one sheet of film having a double width, removing liquid droplets attached to the surfaces of film, subjecting the film to a mechanical or heat treatment, and then winding up the film.

It has been heretofore known that, in the case of producing a tubular film from a crystalline thermoplastic resin, for example, polypropylene resin, a cooling speed of the extruded molten tubular film is slow according to the ordinary air-cooling inflation system, and consequently a film having a low degree of crystallization and a good transparency cannot be obtained.

According to another process, the outside of a molten tubular film is cooled by a cooling liquid from a cooling liquid tank provided on the outside of the film, and at the same time the inside of the film is brought in direct contact with and is made to slide over the surface of a mandrel whose inside is cooled by a cooling liquid. However, it is difficult to increase a speed of film-making highly.

According to still another process, both the inside and outside of a tubular film are cooled by a cooling liquid, but it is also difficult to increase the speed of film-making highly.

The accompanying drawings illustrate modes of embodiments of the present invention.

FIG. 4 shows detail of cooling water-removing section and heat-treating section of the present invention after the slitting of film.

Figure 1:
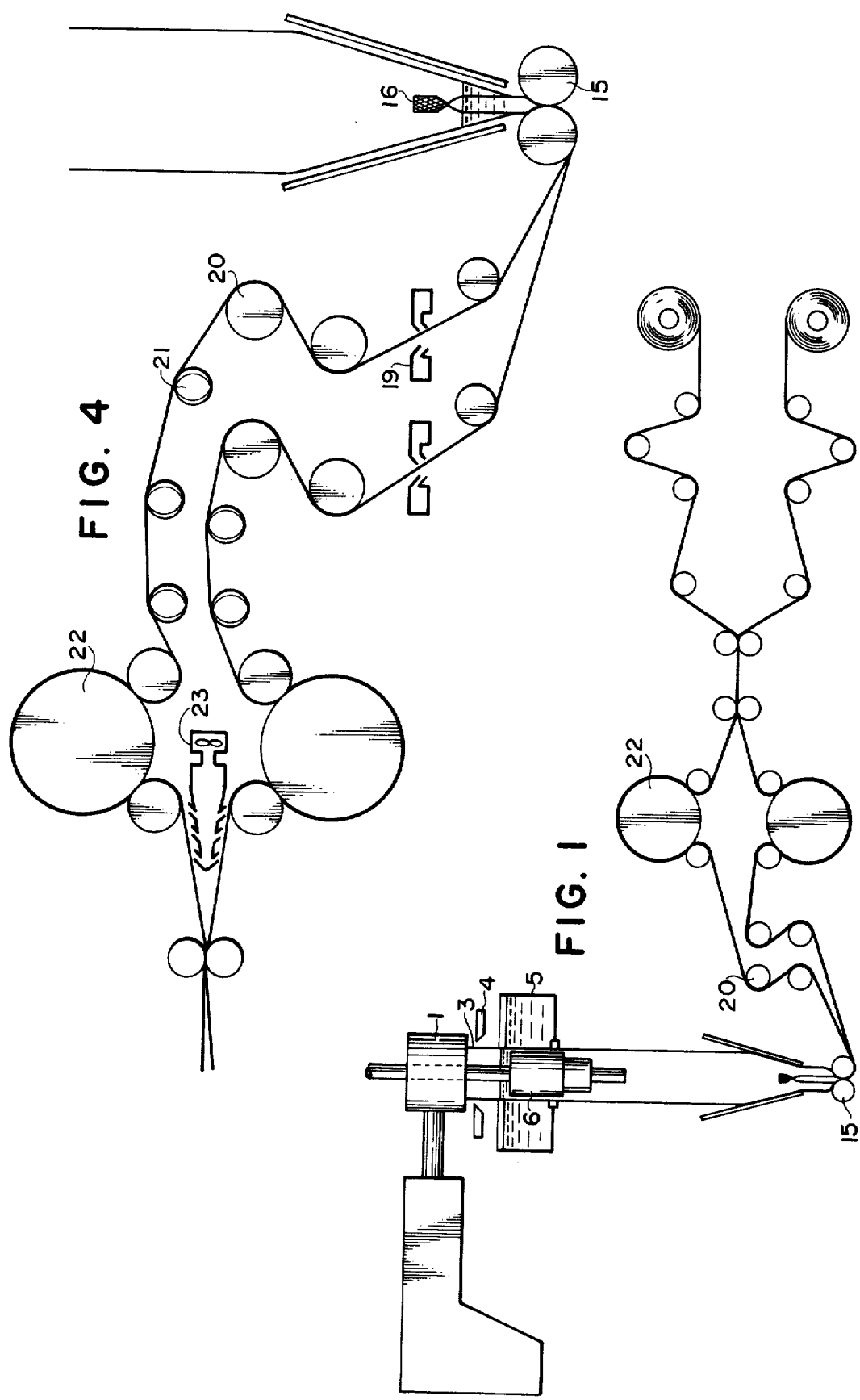
FIG. 1 is a schematic view of one embodiment of an apparatus for carrying out the present invention.

According to the present invention, as shown in FIG. 1, a molten tubular film 3 of crystalline thermoplastic resin is extruded from an annular die 1 provided at an extruder in the downward direction, and cooled preliminarily by the forced air uniformly through an annular air ring 4 provided around the outside of the film. Then the outside of the film is directly cooled by a cooling liquid of a cooling liquid tank 5 provided on the outside of the film, and at the same time, the inside of the film is brought in direct contact with and cooled by a cooling liquid flowing down over the surface of a mandrel 6 suspended from the annular die 1 through the outside cooling liquid tank 5. Then, the film is made to pass, by sliding, through between the mandrel and an elastic material to make tight a clearance between the film and the bottom of the outside cooling liquid tank 5 and led to the outside below the outside cooling liquid tank 5. As to the liquid levels on the inside and outside of the film when the tubular film is cooled from both the inside and outside, the liquid level on the film inside must be higher than that on the film outside.

The cooling liquid kept within the tubular film is discharged to the outside of the film by cutting open lengthwise both the side ends of laid-flat film just before the film is flattened and folded while it is withdrawn by the lower nip rolls 15.

It has been heretofore known that the tubular film is flattened and folded and withdrawn by a pair of nip rolls and then both the side ends of the laid-flat film are cut open lengthwise to produce two sheet films. However, when the tubular film is cut open lengthwise before it is withdrawn by the nip rolls, as in the present invention, it is necessary to completely isolate the pressure on the upper inside of the tubular film from the pressure on the lower inside by means of a mandrel to keep the air pressure constant inside the tubular film.

Then, it is necessary to remove the cooling liquid attached to the withdrawn sheet film as soon as possible. The liquid attached to the film can be removed, for example, by blowing compressed air onto the film and by passing the film through several vacuum suction rolls 20 arranged after said flowing position of compressed air.

The film from which the attached liquid has been removed thereby and which has been almost dried, is then subjected to a mechanical surface-level treatment by surface-leveling rolls 21 under a tension of less than the elastic limit of the film, or the film is heated in that state as it is, to bring the film into a softened state, eliminate an internal strain of the film and bring about a crystalline change. The film is flattened, while preventing occurrence of unevenness in thickness due to the shrinkage of film. The film is further cooled down to room temperature and wound up into a roll form.

The essentials of the present invention comprise a combination of the following three steps, as already described:

1. a step for quenching a molten tubular film of crystalline thermoplastic resin by dried contact of the film with cooling liquid on both the inside and outside of the film and making a film at a high speed.

2. a step for laying flat the resulting tubular film and cutting open lengthwise the side ends of the film before the nipping, and at the same time discharging the cooling liquid on the lower inside of the tubular film, and 3. a step for removing the liquid attached to the surfaces of the film and completely surface-leveling the film by a mechanical or heat treatment.

By satisfying these essentials, a sheet film having a good transparency, less unevenness in film thickness and good flatness can be obtained at a high speed from the molten tubular film of thermoplastic resin.

The object of the present invention cannot be attained therefore whenever any one of these three essentials is not satisfied. For example, a film having a good transparency cannot be obtained from a crystalline thermoplastic resin such as polypropylene according to the ordinary air-cooling inflation process, when said first essential step of film making is not employed.

Since the cooling of the inside surface of a film is carried out indirectly in the case of the outside cooling liquid tank and the cooling mandrel whose inside is cooled by a cooling liquid, the cooling is insufficient, and therefore the film cannot be produced at a high speed. That is, it is necessary to cool the film by directly contacting both the inside and outside of the film with cooling liquids. According to a cooling process using no internal mandrel, the molten tubular film swings, and therefore a film having a definite laid-flat width and a definite thickness cannot be produced continuously.

Accordingly, it is necessary to directly contact both the inside and outside of the film with cooling liquids to make a tubular film having a good transparency, a uniform laid-flat width and an even thickness, and at the same time it is necessary to use a mandrel of the present invention to effect correct sizing of the film.

Cooling means of the present invention comprises an annular air ring provided just below the annular die, an outside cooling liquid tank, and a cooling mandrel capable of making a cooling liquid flow down along the outside of the mandrel. Cooling of the tubular film is carried out preliminarily by the forced air, that is, by the air blown out from the annular air ring, and then carried out rapidly by a cooling liquid, preferably cooling water, from the outside cooling liquid tank. The inside of the tubular film is cooled through direct contact with a cooling liquid, preferably cooling water, which flows down along the surface of the cooling mandrel capable of making the cooling liquid flow down. The liquid level of the cooling liquid, which flows down from the cooling mandrel, has an important relation with the liquid level of the cooling liquid in the cooling liquid tank on the outside of the film. That is, the liquid level inside the film must be always higher than the liquid level outside the film, that is, preferably 5–15 mm higher, because it is necessary to improve the cooling efficiency on the inside of the film to make a film having a good transparency at a high speed, and it is necessary to contact the inside of the film with a sufficient amount of the cooling liquid. Whenever the liquid level on the outside is higher, the film tends to be curved inwardly owing to the liquid pressure from the outside, and consequently the film is caught by the cooling mandrel, or the film is in partial contact with the cooling mandrel. Fingerprint-like patterns can be prevented from occurrence by keeping the inside liquid level higher. The prevention of occurrence of fingerprint-like patterns, and the normal film making are especially important factors for the production of a film at a high speed as in the present invention.

According to the present invention, both the side ends of the laid-flat film are cut open lengthwise before the film is withdrawn by nip rolls. Be effecting the slitting at that position, the cooling liquid kept within the tubular film can be discharged therefrom. Therefore, the film can be readily transferred to the next step for removing the cooling liquid attached to the film.

The liquid attached to the surfaces of the film is removed, for example, by blowing compressed air onto the film, and further completely removed by vacuum suction rolls. Then, the film is transferred to a flattening step, where the film is subjected to mechanical or heat surface-leveling treatment. Whenever a tubular film is produced by applying the direct liquid cooling to both the inside and outside of the film, it is indispensable to remove the attached liquid from the film. When a sheet film is prepared by slitting the tubular film, the film must be passed through a step for laying flat the film, and accordingly there occurs a difference in flatness due to the internal strain or others between the surface and the outside surface of the film, and further there are brought about curvings or saggings. Therefore, the flattening treatment is necessary. According to the present invention, a sheet film having good properties can be produced through a tubular film by the combination of these steps.

Now, the present invention will be explained in detail, referring to the drawings.

Figure 2:
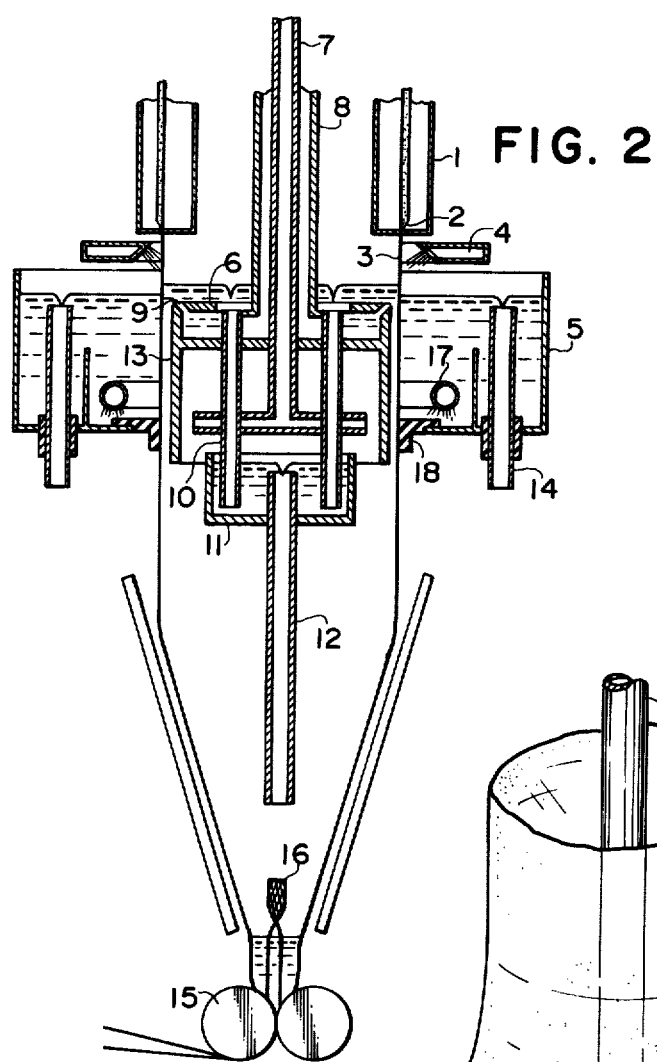
FIG. 2 shows detail of film-making section of the present invention.

As shown in FIG. 2, a molten tubular film 3 of crystalline thermoplastic resin such as polypropylene is extruded from a ring-form slit 2 of an annular die 1 fixed to an extruder in the downward direction, and preliminarily cooled by the forced air at room temperature from an air ring 4 positioned just below the annular die 1. Then, the film 3 is cooled from the outside by cooling liquid of an outside cooling liquid tank 5. At the same time, the inside of the film 3 is cooled through direct contact with cooling liquid flowing down along the surface of a mandrel 6 suspended from the annular die 1 through the outside cooling liquid tank 5. At that time, the level of cooling water on the inside of the film 3 must be higher by about 10 mm than the liquid level of the cooling water on the ouside.

The mandrel 6 provided with an air supply pipe 7, which supplies the air into the film 3, and a cooling liquid supply pipe 8, is suspended from the annular die 1 by the pipe 8. The inside structure of the mandrel 6 further involves an annular slit 9 for passing the cooling liquid, an overflow pipe 10 for the cooling liquid, a reservoir 11 for the overflown cooling liquid, an outlet pipe 12 for the cooling liquid, and an outer wall 13 for the mandrel 6. Therefore, the cooling liquid supplied from the pipe 8 is passed through the slit 9, and flows down along the outer wall 13 to directly cool the film 3 from the inside. At the same time, the overflown liquid is passed through the overflow pipe 10, the reservoir 11 and the outlet pipe 12, and discharged to the outside. At that time, the outer wall 13 serves as a section to control the tube diameter of the film 3, and plays an important role to keep the laid-flat width of the film constant. Further, the reservoir 11 serves to seal the air layer of the upper part from that of the lower part of the mandrel 6 inside the film 3, and prevents a change in the film size due to the fluctuation in the air pressure, that is, the change in the laid-flat width and unevenness in thickness of the film 3.

The outside cooling liquid tank 5 is provided with a cooling liquid supply pipe 17 and an overflow pipe 14, and further with an elastic material 18 for sealing a clearance between the bottom of the liquid tank 5 and the film 3.

In this manner, a tubular film is prepared by a cooling apparatus consisting of a combination of a preliminary, forced cooling apparatus, an outside cooling liquid tank and a cooling mandrel according to the cooling process of the present invention, and a film having a good transparency and less unevenness in thickness can be produced at a high speed.

Any cooling liquid can be used in the present invention, so long as the cooling liquid will not corrode the film, mandrel and liquid tank. However, water is usually used as the cooling liquid from an economical viewpoint.

Figure 3:
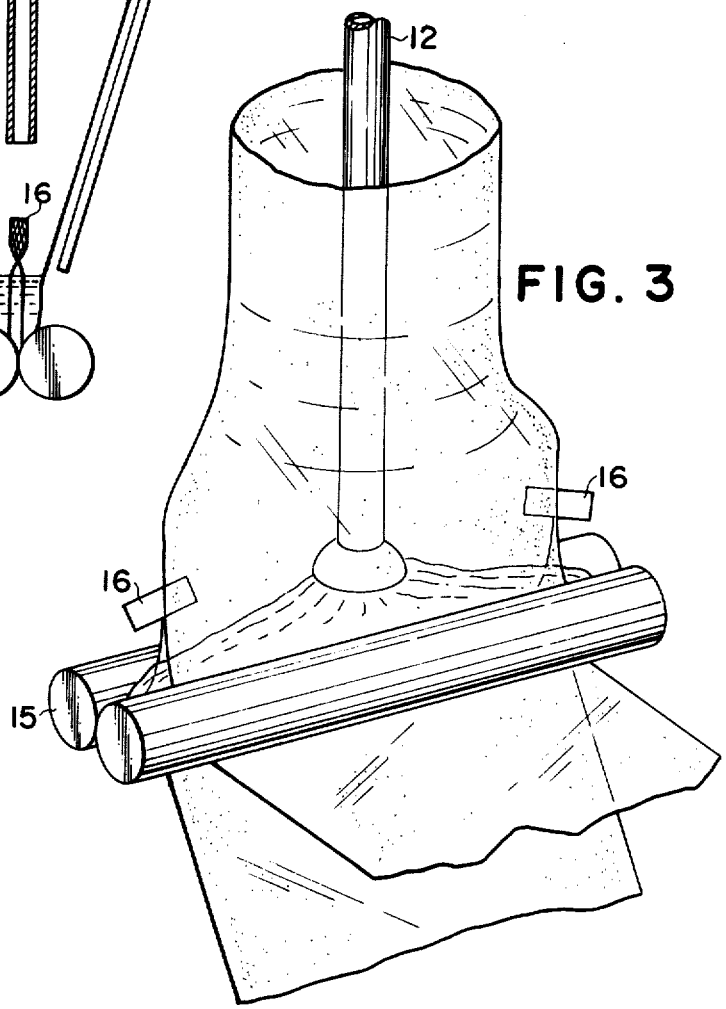
FIG. 3 shows a state of film at tubular film-slitting section after the film-making.

The thus prepared film is laid flat by a film-flattening and folding apparatus, and led to nip rolls 15. However, in the course of said flattening and folding process, both the side ends of the film are cut open lengthwise by a slitter 16. Since the slitter cannot be exchanged while producing the film, it is preferable to use a slitter which is not necessary to exchange so often, for example, a disc slitter. One embodiment of the slitting operation is shown in FIG. 3.

The slit film is separated into two sheet films after the nip rolls 15, and led to a drying step. The drying is carried out, first of all, by a compressed air-blowing apparatus 19, where both the sides of the film are blown with the compressed air to remove the liquid attached to the surfaces of the film, and then by several vacuum suction rolls 20, where the attached liquid is completely removed. The vacuum suction rolls 20 have a large number of openings having diameters of a few millimeters on the surfaces of the rolls, and are connected to a vacuum pump. To treat both the sides of the film, it is preferable to provide at least two rolls for each film.

The thus dried two films are gradually subjected to a mechanical surface-leveling treatment by several surface-leveling rolls 21 under a tension of less than the elastic elongation limit of the film.

For the surface-leveling treatment, for example, a large number of Crown rolls or expander rolls can be used as shown in FIG. 4. In the successive heat treatment, the films are heated to about 70° C to 80° C in a mechanically surface-leveled state by heat-treating rolls 22 to bring the films into a softened state, whereby the internal strain is removed, and the surface-leveling is completed. In said heat treatment, for example, mirror-like surface-finished rolls can be used.

After the heat treatment, the films are blown with air from an air blowing apparatus 23, cooled down to room temperature, and wound up. In this manner, a film having a good flatness can be obtained, while preventing the shrinkage of the film and occurrence of unevanness in thickness.

The crystalline thermoplastic resin film is liable to be damaged readily by a mechanical impact, and irregularities are liable to appear in the flatness due to the changes in temperature or tension. However, according to the present invention, there is no need for rewinding and reslitting after the winding-up of the film, and therefore a film having a good quality can be obtained.

Particularly when a sheet film is prepared from a tubular film, a film having a good flatness cannot be obtained, contrary to the T-die process. However, a film having good flatness can be obtained according to the present invention. In that case, the flatness of a film is determined by the degree of sagging of a film when a film of 3 m in length is extended over a wood frame, one end of the film being fixed to the frame, and a weight of 1 kg/m in width being suspended at the other end of the film to apply a tension to the film. In the case of a film having a thickness of about 20 $\mu$, the sagging must be about 25 mm or less. The films prepared according to the present invention all fall within the flatness standard.

According to the present invention, a film having a thickness of 15 $\mu$ to about 50 $\mu$ can be prepared at a speed of 70 to 80 m/min., and thicker films can be also prepared without any considerable reduction in the speed.

The present invention can involve the rewinding and slitting means, and further can involve, if necessary, for example, a corona discharge treating apparatus, and apparatuses for processing by coating or laminating or the like.

Now, the present invention will be explained, referring to example.

EXAMPLE

Propylene homopolymer resin having a melt index of 8.0 was extruded vertically downwards at a resin temperature of 230° C from an annular die having a ring form slit of 25 inch (638mm) in diameter, using an extruder of 90mm in screw diameter.

The molten tubular film was preliminarily aircooled forcibly at an air rate of 2m$^3$/min. by an air ring positioned just below the die, and at that time a blow ratio (a ratio of the diameter of a tubular film to the diameter of die) was 0.9. Then, the film was brought into direct contact with cooling water at 19° C in an outside cooling liquid tank, as shown in FIG. 2, and cooled. At the same time, the inside of the film was brought into direct contact with the cooling water flowing down along the surface of a mandrel having a structure as shown in FIG. 2 and being suspended from the annular die through the outside cooling liquid tank. At that time, the outside cooling water amounted to 3 tons/hour, and the cooling water flowing down along the inside mandrel amounted to 4.3 tons/hour. The water level was kept higher by 8 mm on the inside of the film than that on the outside of the film.

The film was thus cooled from both the inside and outside of the film, and passed, by sliding, through between the mandrel and a rubber ring which sealed a clearance between the bottom of the cooling liquid tank and the film and led downward to the outside of the outside cooling liquid tank.

The film was folded by a film folding apparatus arranged in V shape, and in the course of folding, the film was cut open lengthwise by slitters provided at positions corresponding to the lines of folding of the film before entering into the nip rolls. The cooling water flowing down from the mandrel was discharged to the ouside of the film at a position below the slitter position.

The film was thereby slit into two sheet films, withdrawn by nip rolls, separated and entered into a water-removing and drying apparatus and a surface-leveling apparatus as shown in FIG. 4. First of all, water droplets attached to the surfaces of films were removed by compressed air blown from a compressed air blowing apparatus, and further the water still adhered to the surfaces was removed by two vacuum suction rolls in a vacuum of 700 mmHg/ 1 m$^3$/min. The dried films were gradually surface-leveled mechanically by two expander rolls, and then brought into between heating rolls to heat the films at 75° C to 80° C, whereby the surface-leveling treatment was carried out.

Finally, air at room temperature was blown onto the films to cool the film down to the room temperature and wound up on two rolls. Films having a film width of 850 mm, film thickness of 20 microns, unevenness in film thickness of ± 3.8%, transparency of 98%, haze of 2.1% and flatness (sagging) of 14 mm were obtained at a speed of 76 m/min.

What is claimed is:

1. A process for producing a sheet film from a tubular thermoplastic resin film which comprises:

a. extruding a molten tubular film of crystalline thermoplastic resin downwardly through an annular die, b. passing the outside of said downwardly extruded tubular film into contact with a body of a cooling liquid, c. introducing cooling liquid into the interior of said downwardly extruded tubular film so that a body of cooling liquid is formed in the interior of said tubular film opposite to the body of cooling liquid contacting the exterior of said tubular film, d. maintaining the level of the body of cooling liquid on the inside of said tubular film 5 – 15 mm higher than that of the level of the body of cooling liquid on the exterior of the tubular film, e. flattening the cooled film, f. providing a lengthwise cut in said tubular film immediately prior to step (e) and permitting the liquid which was used to cool the inside the tubular film to flow out, and g. removing essentially all liquid from the surfaces of the tubular film after it has been cut and flattened.

2. A process according to claim 1 wherein the thermoplastic resin film is a homopolymer or a copolymer of propylene.

3. A process according to claim 11 wherein the molten tubular film is cooled by contact with forced air prior to step (b).

4. A process according to claim 11 wherein the film after step (e) is subjected to mechanical surface-leveling treatment by passing through a series of several rolls under a tension of less than the elastic limit of the film, heated to a softened state, and then cooled down to room temperature.

5. An apparatus for producing a sheet film which comprises in combination.

a. an annular die associated with an extruder which is adapted to produce a molten tubular resin film, b. an annular ring positioned below said annular die which is adapted to cool the exterior surface of a molten tubular film extruded through said annular die, c. a first reservoir for cooling liquid positioned below said annular air ring and having an interior perimeter that is adapted to surround said tubular film so that the cooling liquid will be in direct contact with the exterior surface of the tubular film, d. a second reservoir for cooling liquid also positioned below said annular air ring, whose exterior perimeter is within the interior perimeter of said first reservoir and which is adapted to directly contact the interior surface of the tubular film, e. slitting means positioned below said first and second reservoirs which slitting means is adapted to make a lengthwise opening in at last one side of the tubular film, f. means for flattening said tube after it has been slit, and g. means for removing residual liquid from said film after it has been slit, h. said second reservoir for cooling liquid containing liquid height adjustment means which is adapted to maintain the level of liquid in said second reservoir higher than said first reservoir.

6. An apparatus according to claim 5 wherein said first reservoir includes a cooling liquid supply pipe, an overflow pipe and an elastic material adjacent the bottom of the reservoir which is adapted to form a seal between the bottom of the reservoir and the tubular film.

7. An apparatus according to claim 5, wherein the slitting means is a disc slitter.

8. An apparatus according to claim 5 wherein the means for removing residual liquid comprises a compressed air blowing device for blowing air onto both the inside and outside of the film, and vacuum suction rolls having openings of a few millimeters in diameter on the roll surface which are connected to a vacuum pump.

* * * * *

UNITED STATES PATENT OFFICE
CERTIFICATE OF CORRECTION

PATENT NO. : 4,003,973
DATED : January 18, 1977
INVENTOR(S) : Kazuhiko Kurokawa et al.

It is certified that error appears in the above-identified patent and that said Letters Patent are hereby corrected as shown below:

Col. 8, line 17 (Claim 5 e); delete "at last" and insert

--- at least ---.

Signed and Sealed this

Twelfth Day of April 1977

[SEAL]

Attest:

RUTH C. MASON
*Attesting Officer*

C. MARSHALL DANN
*Commissioner of Patents and Trademarks*